United States Patent [19]

Carson et al.

[11] Patent Number: 5,049,037
[45] Date of Patent: Sep. 17, 1991

[54] AUTOMATIC WELL PUMP SKIMMER LEVEL CONTROL

[75] Inventors: Glenn S. Carson, Mechanicsburg; Kermit W. Bender, Elizabethtown, both of Pa.

[73] Assignee: R. E. Wright Associates, Inc., Middletown, Pa.

[21] Appl. No.: 456,308

[22] Filed: Dec. 26, 1989

[51] Int. Cl.$^5$ .............................................. F04B 47/06
[52] U.S. Cl. ....................................... 417/36; 417/40; 417/53; 166/53; 166/385; 210/104
[58] Field of Search ................... 417/36, 40, 53; 210/776, 104; 166/53, 385, 68, 369

[56] References Cited

U.S. PATENT DOCUMENTS

| | | | |
|---|---|---|---|
| 3,915,225 | 10/1975 | Swink | 210/104 |
| 4,187,912 | 2/1980 | Cramer | 166/314 |
| 4,273,650 | 6/1981 | Solomon | 210/104 |
| 4,404,093 | 9/1983 | Moyer | 210/138 |
| 4,466,777 | 8/1984 | Kimberlin | 417/12 |
| 4,469,170 | 9/1984 | Farmer, Jr. | 210/923 |
| 4,663,037 | 5/1987 | Breslin | 210/923 |
| 4,718,486 | 1/1988 | Black | 166/385 |
| 4,746,423 | 5/1988 | Moyer | 210/104 |
| 4,928,771 | 5/1990 | Vandevier | 166/68 |

Primary Examiner—Leonard E. Smith
Assistant Examiner—David W. Scheuermann
Attorney, Agent, or Firm—Martin Fruitman

[57] ABSTRACT

A control system for an in-well pump for recovery of hydrocarbons which are lighter than water. Two electrical probes and a float switch are used to control the automatic raising and lowering of the pump within the well to always maintain its input within the hydrocarbon layer. The pump is also controlled so that it only operates when its input is within the hydrocarbons to assure that it does not pump water and that it is not operated in air.

5 Claims, 2 Drawing Sheets

AUTOMATIC WELL PUMP SKIMMER LEVEL CONTROL

SUMMARY OF THE INVENTION

This invention deals generally with liquid purification and separation and more specifically with the use of mechanical pump operated skimmers within wells.

As the public has become more aware of major oil spills, there has been more concern about all such spills, not only those in the oceans and in streams, but also the smaller spills in more localized situations, such as leaks from underground oil and gasoline tanks. This has lead to stringent government regulations to attempt to prevent long term contamination of the environment by such spills. Some such regulations deal specifically with ground spills which cause oil or gasoline to accumulate within underground wells which are used as water sources. The essential effect of such regulations is to require the removal of all detectable amounts of oil, gasoline and other hydrocarbons from such wells. Moreover, one of the established methods of cleanup from an above ground spill is to drill deep wells which accumulate hydrocarbons and then remove the hydrocarbons from the wells.

To date there have been essentially two systems for the removal of hydrocarbons from deep wells. One of these systems, which is shown in U.S. Pat. No. 4,404,093 by Moyer, essentially involves dropping a bucket into the well and permitting it to sink into the liquid until its top is just at the upper surface of the hydrocarbons, so that only the hydrocarbons flow into the bucket, which is then lifted to the surface for emptying. The technique of permitting only the uppermost layer of liquid to enter a container, whether the container is a bucket or the input of a pump, is called skimming.

The second generally used hydrocarbon recovery method involves using a pump skimmer which is located at a relatively fixed position in a well. In such a system, which is shown in U.S. Pat. No. 4,746,423, also by Moyer, a water pump is used to actually lower the natural water table so that it acts as a funnel, a so called "cone of depression", to aid in the collection of the hydrocarbons. The availability of the water pump in such a system permits the hydrocarbon pump to remain fixed in a suitable collection location because the water pump controls the location of the collection point of the hydrocarbons.

Both of these established systems do have drawbacks however. The bucket skimmer systems tend to be very slow because of the time required for raising and lowering them, so they are only truly useful for situations in which hydrocarbons are accumulating very slowly.

On the other hand, the cone of depression method requires the pumping of a great deal of uncontaminated water in order to maintain the cone of depression so that the hydrocarbons will be properly directed to the skimmer pump. Moreover, it is often necessary to constantly adjust the water pumping rate to accommodate to widely varying flows of ground water.

Thus, many situations are simply not appropriate for either of these existing systems. For instance, a deep well which has moderate but erratic flow is difficult to keep clean by either a bucket skimmer or a pump skimmer that uses the cone of depression.

The present invention is particularly beneficial in a situation where the water flow into a well is erratic, and therefore the water level in the well, upon which the hydrocarbons float, is constantly changing.

The present invention actually constantly adjusts the location of the input of the hydrocarbon pump, so that it is always properly located to take in only hydrocarbons. Furthermore, the system keeps the pump from operating if the levels change so dramatically that the pump input is temporarily in an improper location while its location is being adjusted, or if there is too small a hydrocarbon layer to pump.

These benefits are attained by controlling the pump location and activation with sensors which sense the locations of both the water to hydrocarbon interface and the hydrocarbon to air interface. In the preferred embodiment, the two sensors used are a float switch and a set of conductivity probes. The conductivity probes are located at approximately the same level as the pump input, and the float switch is located so that it indicates when the pump input is in liquid. The outputs of these two sensors are combined in a logic circuit to control the raising and lowering of the pump input and to turn the pump on and off.

The combination of signals from the two sensors indicates the location of the pump input and whether any action should be taken. There are essentially four conditions to be evaluated.

The first condition is when the float switch is not floating, thus indicating the pump input is above the depth required to cause the float to rise, which means it is in air or not deep enough in liquid, and at the same time, the conductivity probe indicates high resistance, which indicates the pump input is not in water. Under this circumstance the pump is turned off and lowered to reach the proper liquid level. As the pump is lowered, either the float switch will activate or the conductivity probe will indicate low resistance.

The second condition is attained if, at any time, such as when the pump is being lowered, only the conductivity probes are activated, that is, they indicate low resistance. It means that the pump input is in water, but the liquid level is insufficient to activate the float switch. Therefore, there is little or no contaminant liquid level, and the pump height adjustment is stopped, but the pump remains off.

The third condition is when the float switch is the only one activated, for instance, when the pump is being lowered. It means that the pump input is in a liquid, but the liquid is a nonconductive liquid, meaning contaminant liquid such as hydrocarbons, so the height adjustment of the pump is stopped, and the pump is turned on.

The fourth condition is when the float is activated, indicating the pump input is in liquid, and the conductivity probes indicate low resistance, indicating the liquid is water. For this condition the pump is turned off and it is raised.

As the pump is raised, either the second or third condition will result, and the appropriate action will be taken. However, it should also be appreciated that the level adjustment of the pump input can also result from changes of liquid level in the well, and in such cases the resulting action will be the same.

It is, in fact, the reaction of the system to liquid level changes in the well which give the present invention its utility. Once placed into a well and turned on, the present invention will follow the liquid level in the well, and without operator intervention, will continuously pump out only hydrocarbons, with no pumping of water.

The present invention therefore supplies a completely automatic well skimmer for hydrocarbons which operates regardless of the well's rate of intake of either water or hydrocarbons.

DETAILED DESCRIPTION OF THE INVENTION

Figure 1:
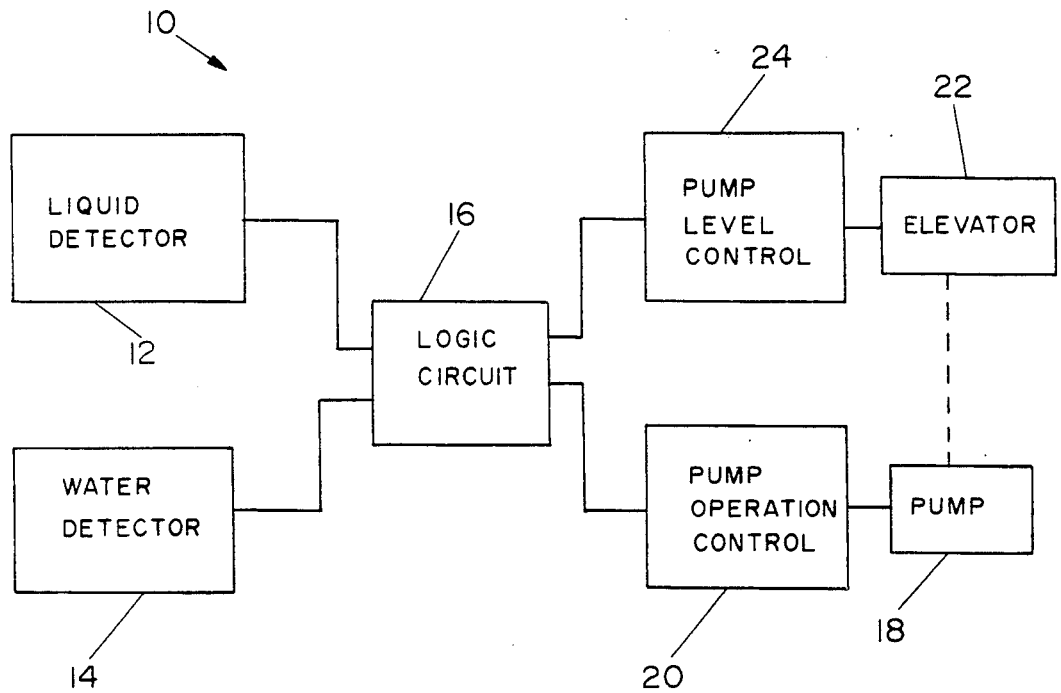
FIG. 1 is a simplified block diagram of the preferred embodiment of the invention.

FIG. 1 is a simplified functional block diagram of well pump level control system 10 in which two sensors, liquid detector 12 and water detector 14, are interconnected with and send electrical signals to logic circuit 16. Logic circuit 16 is interconnected with pump level control 24 and with pump operation control 20. Logic circuit 16 then processes the signals from detectors 12 and 14, and, depending upon the conditions to which detectors 12 and 14 are subjected, controls the operation of pump 18 through operation control 20, or raises or lowers pump 18 by means of elevator 22, which is controlled by pump level control 24.

Each of the components indicated in FIG. 1 are of conventional design and are well within the ability of one skilled in the art of pump and mechanical control. For instance, in the preferred embodiment, elevator 22 is a pneumatic piston, but a motor driven winch could also easily be used for that purpose. Also, logic circuit 16 in the preferred embodiment is a relay circuit, but it could also be constructed of discrete semiconductor components, or a microprocessor could be used to accomplish the same function.

Figure 2A:
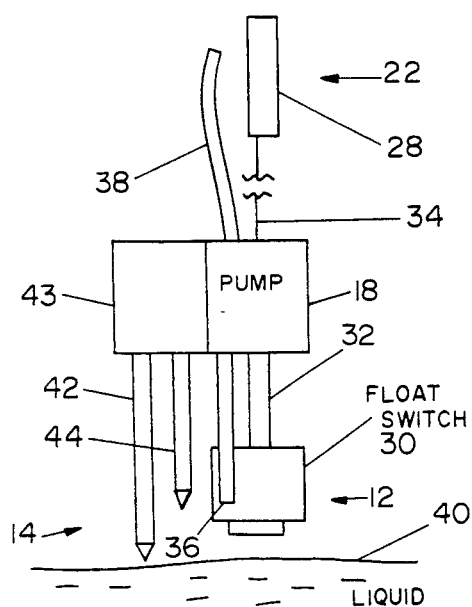
FIGS. 2A-2D are simplified schematic diagrams of the preferred embodiment of the invention in four different conditions in relationship to the liquids in the well.

FIGS. 2A-2D are simplified schematic diagrams of the preferred embodiment of the invention. Each of FIGS. 2A-2D shows a different condition to which the invention responds, while only FIG. 2A shows the basic configuration of the mechanical components of the invention.

FIG. 2A shows the preferred embodiment of the invention as it would be oriented within a well from which it is desired to remove contaminant liquid. FIG. 2A can best be considered as showing the condition that exists as the invention is being lowered into the well (not shown), or the condition within the well after natural conditions have caused liquid 40 to drop dramatically. In FIG. 2A, pump 18 and elevator 22, which is pneumatic piston 28, are operated as a result of the conditions sensed by liquid detector 12 and water detector 14.

In the preferred embodiment pictured in FIGS. 2A-2D, liquid detector 12 is float 30, which, quite conventionally, rides up and down on stem 32. Float 30 is adjusted so that it produces an electrical signal when pump input 36 is located below a certain predetermined depth in liquid 40. As is common in such arrangements, the float initiates an electrical signal by activating a magnetic switch (not shown). It is the magnetic switch which is interconnected with logic circuit 16 (FIG. 1) and furnishes an electrical signal to it.

Pump 18 is raised and lowered by pneumatic piston 22 to which it is attached by cable 34, and, when in operation, pump 18 takes in liquid through pump input 36. The liquid from pump 18 is directed to the ground surface above the well by output pipe 38. Since the only liquids actually raised to ground level by pump 18 are contaminants to be disposed of, the liquid from pipe 38 is directed into a container (not shown) above ground.

It should be apparent that float 30 responds essentially to the presence or absence of liquid, and its action is affected only slightly by the difference in specific gravity of particular liquids. It acts basically to generate an electrical signal when pump input 36 is immersed below the predetermined depth in some sort of liquid.

Water detector 14 is therefore used to further distinguish whether liquid 40, within which pump input 36 may be immersed, is water or some contaminant liquid such as hydrocarbons. Water detector 14 is a conventional conductivity sensor which is comprised essentially of a pair of probes 42 and 44 with conductive ends. Typically a voltage is supplied to the conductive end of one probe, and if a conductive path exists between the probe ends, a signal is transmitted to the other probe end from which the signal is sent to logic circuit 16 (FIG. 1), thus indicating to the logic circuit that the pump input is immersed in a conductive fluid.

Since the only conductive fluid available within the well is water, if a signal is available from water detector 14, it means that pump input 36 is immersed in water. This distinction is assured by locating the conductive portions of conductivity sensor probes 42 and 44 at levels so that they are in close proximity to the pump input. With such an orientation, the absence of conductivity, when float switch 30 indicates that pump input 36 is in liquid, can only mean that the pump input is in contaminant liquid, and it is appropriate to pump that liquid to the surface. The precise location of probes 42 and 44 is accomplished in the preferred embodiment by attaching their mounting fixture 43 to pump 18.

The four conditions to which the pumping system can be subjected are shown in FIGS. 2A through 2D and are discussed below.

Figure 2B:
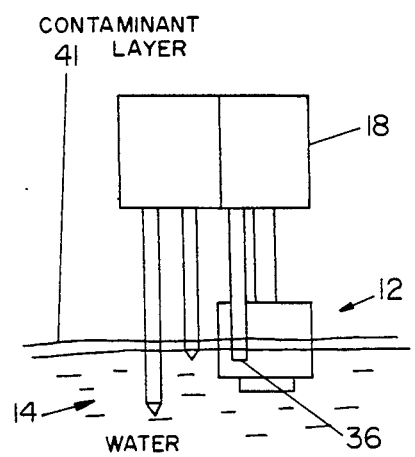

FIG. 2A shows the condition when the pump is being lowered into the well, or where there has been a drop in the liquid level in the well. In such a circumstance, float switch 30 is not activated, indicating the absence of liquid at pump input 36, and water detector 14 is also not activated, indicating the absence of water at the pump input. Logic circuit 16 interprets this condition as the pump input being above the liquid level, regardless of what the liquid is, and keeps pump 18 off, but lowers pump 18 toward liquid 40. FIG. 2B shows the condition when pump input 36 is in liquid, but is at such a shallow depth in the liquid that it is above the predetermined depth, and liquid detector 12 is not activated. However, water detector 14 is nevertheless indicating that it is in water. This apparently conflicting information is merely indicating that there is very little, if any, contaminant liquid floating on the water, and in any case it is insufficient to require pumping. Therefore, pump 18 is not operated and it is also neither raised nor lowered.

Figure 2C:
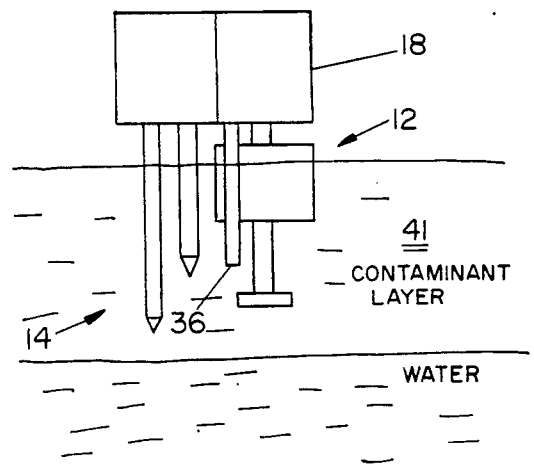

FIG. 2C shows the one condition which requires pumping. Float switch 12 is activated, indicating that pump input 36 is below the predetermined depth in liquid, and conductivity probes 42 and 44 are indicating that the liquid which the pump input is in is not water, that is, there is no significant conduction between probes 42 and 44. Obviously, if there is liquid at the pump input and it is not water, it is contaminant, and it is desirable to pump it up to ground level, so pump 18 is operated, but the pump is neither raised nor lowered.

Figure 2D:
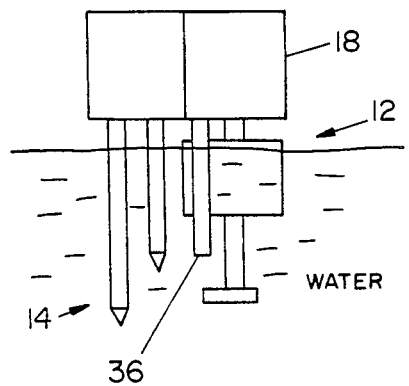

Finally, FIG. 2D shows the condition in which pump input 36 is deep enough within the liquid of the well to activate the float switch, while water detector 14 is generating an electrical signal which indicates that the pump input is in water. The pump is therefore prevented from pumping liquid and the pump is also raised to approach the level of the contaminant liquid which might be floating atop the water.

The present invention therefore furnishes a system which does not require pumping any water to the surface of the well, but nevertheless automatically removes contaminants continuously and effectively without difficulty, despite wide variations in the rates at which both water and contaminants might enter the well.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance, different forms of sensors could be used for both liquid detector 12 and water detector 14, and different types of logic circuits including pneumatic logic can also be used to combine the information from the sensors and to control pump operation and elevation.

What is claimed as new and for which Letters Patent of the United States are desired to be secured is:

1. A well pump skimmer control apparatus comprising:
    a liquid pump located within a well with the pump output connected by a pipe to the ground surface above the well and the pump including a pump input through which liquid enters the pump;
    a pump elevator means connected to the pump and capable of raising and lowering the pump within the well;
    a liquid detector means located within the well and producing a signal when the pump input is immersed in a liquid to at least a predetermined depth;
    a water detector means located within the well and producing a signal when the pump input is immersed in water; and
    a logic circuit means interconnected with and receiving signals from the liquid detector means and the water detector means, and also interconnected with and providing signals to the pump elevator means and to the pump, the logic circuit means interpreting the signals it receives and controlling the action of the pump elevator means and the operation of the pump so that when the pump input is:
    not in water and not below the predetermined depth, the pump is not operated and the pump elevator means lowers the pump;
    in water and not below the predetermined depth, the pump is not operated and the pump elevator means is not operated;
    not in water and below the predetermined depth, the pump is operated and the pump elevator means is not operated; and
    in water and below the predetermined depth, the pump is not operated and the pump elevator means raises the pump.

2. The well pump skimmer control apparatus of claim 1 wherein the liquid detector means is a float switch.

3. The well pump skimmer control apparatus of claim 1 wherein the water detector means is a conductivity sensor.

4. The well pump skimmer control apparatus of claim 1 wherein the pump elevator means is a pneumatic piston.

5. A method of controlling the operation of a pump which has a pump input located within a well and a pump output connected to a point at the ground surface above the well, and controlling the elevation of the pump in the well, in order to cause the pump to move only liquids other than water to the ground surface above the well and to adjust for changes in liquid level in the well, comprising:
    determining whether the input of the pump is below a predetermined depth in a liquid;
    determining whether the input of the pump is in water; and
    controlling the operation of a pump elevator means which raises and lowers the pump and the operation of the pump so that when the pump input is:
    not in water and not below the predetermined depth, the pump is not operated and the pump elevator means lowers the pump;
    in water and not below the predetermined depth, the pump is not operated and the pump elevator means is not operated;
    not in water and below the predetermined depth, the pump is operated and the pump elevator means is not operated; and
    in water and below the predetermined depth, the pump is not operated and the pump elevator means raises the pump.

* * * * *